US011116225B2

(12) United States Patent
Merriweather

(10) Patent No.: US 11,116,225 B2
(45) Date of Patent: Sep. 14, 2021

(54) COOKING DEVICE

(71) Applicant: Augustus Merriweather, Centerville, OH (US)

(72) Inventor: Augustus Merriweather, Centerville, OH (US)

( * ) Notice: Subject to any disclaimer, the term of this patent is extended or adjusted under 35 U.S.C. 154(b) by 378 days.

(21) Appl. No.: 16/211,503

(22) Filed: Dec. 6, 2018

(65) Prior Publication Data

US 2019/0200620 A1  Jul. 4, 2019

Related U.S. Application Data

(60) Provisional application No. 62/608,892, filed on Dec. 21, 2017.

(51) Int. Cl.
| | | |
|---|---|---|
| *A47J 37/00* | (2006.01) | |
| *A21B 3/15* | (2006.01) | |
| *A47J 37/07* | (2006.01) | |
| *F24C 15/16* | (2006.01) | |
| *A47J 37/06* | (2006.01) | |
| *A47J 33/00* | (2006.01) | |
| *A47J 43/18* | (2006.01) | |

(52) U.S. Cl.
CPC ............. *A21B 3/15* (2013.01); *A47J 37/0694* (2013.01); *A47J 37/0786* (2013.01); *F24C 15/16* (2013.01); *A47J 33/00* (2013.01); *A47J 43/18* (2013.01)

(58) Field of Classification Search
CPC ............ A47J 37/0694; A47J 2037/0795; A47J 37/0786; A47J 37/01; A47J 37/04; A47J 43/18

USPC .......................................... 99/450, 426, 449
See application file for complete search history.

(56) References Cited

U.S. PATENT DOCUMENTS

| | | | | |
|---|---|---|---|---|
| 2,360,026 A | | 10/1944 | Wall | |
| 2,503,795 A | | 4/1950 | Clark | |
| 2,740,349 A | * | 4/1956 | De Gonia | ........... A47J 37/1295 |
| | | | | 99/426 |
| 2,924,168 A | | 2/1960 | Jamentz | |
| 3,915,309 A | | 10/1975 | Brazdo | |
| 4,427,706 A | * | 1/1984 | El-Hag | ................. A47J 36/022 |
| | | | | 426/243 |
| 4,559,869 A | | 12/1985 | Hogan | |
| 5,400,704 A | * | 3/1995 | Huston | .................... A21D 8/06 |
| | | | | 219/729 |
| 5,562,023 A | | 10/1996 | Harrison | |

(Continued)

FOREIGN PATENT DOCUMENTS

| | | |
|---|---|---|
| DE | 102005025164 A1 | 12/2006 |
| DE | 102005025164 B4 | 6/2011 |
| WO | 2017114621 A1 | 7/2017 |

*Primary Examiner* — Reginald Alexander
(74) *Attorney, Agent, or Firm* — Stevens & Showalter LLP

(57) ABSTRACT

A cooking device including a base having a bottom plate with a plurality of slots, a first end wall, a second end wall, and a side wall. The cooking device also includes at least one first rack removably coupled to the base, the at least one first rack including a main body portion having a rack tab, and at least one second rack removably coupled to the base, the at least one second rack including a main body portion and an upper plate extending from an upper surface of the second rack main body portion. The second rack main body portion has a rack tab. The base includes structure for receiving the rack tabs to secure the respective first and second racks to the base.

18 Claims, 3 Drawing Sheets

(56) References Cited

U.S. PATENT DOCUMENTS

| | | | |
|---|---|---|---|
| 5,714,740 | A | 2/1998 | Kelly et al. |
| 6,116,153 | A | 9/2000 | Burrows |
| 6,386,096 | B1 | 5/2002 | Tiemann |
| D538,106 | S | 3/2007 | Julian |
| D542,092 | S | 5/2007 | Raichlen et al. |
| 7,281,469 | B1 | 10/2007 | Barbour et al. |
| 7,669,523 | B1 | 3/2010 | Zemel et al. |
| D668,103 | S | 10/2012 | Cloutier et al. |
| 8,418,604 | B1 | 4/2013 | Zemel et al. |
| 8,627,764 | B1 | 1/2014 | Cloutier et al. |
| 9,730,553 | B2 * | 8/2017 | Bombard ............. A47J 37/0694 |
| 10,555,640 | B1 * | 2/2020 | Marks ..................... A47J 43/18 |
| 2009/0260526 | A1 | 10/2009 | Anderson et al. |
| 2011/0108556 | A1 * | 5/2011 | Levie ...................... A47J 37/01 |
| | | | 220/573.1 |
| 2015/0164276 | A1 | 6/2015 | Crow |
| 2018/0344092 | A1 * | 12/2018 | Meyer ................. A47J 37/0694 |

\* cited by examiner

COOKING DEVICE

FIELD OF THE INVENTION

The present invention relates generally to cooking devices for barbeque grills or kitchen ovens, smokers and more particularly to support frames for supporting food items during grilling or baking.

BACKGROUND OF THE INVENTION

Outdoor cooking using gas or charcoal-fired grills and smokers is widely done. Popular food items for grilling and smoking include poultry wings and legs, pork ribs, fish, roasts and vegetables. Traditionally, when cooking, the food items are placed horizontally on a cooking surface of the grill. When attempting to grill a variety of food items at one time, space can often be limited. Thus, there remains a need for a cooking rack that supports a variety of food items all at once.

BRIEF SUMMARY OF THE INVENTION

One aspect of the present invention relates to a cooking device that includes a base including a bottom plate having a plurality of slots, a first end wall extending at a first angle relative to the bottom plate, a second end wall extending at a second angle relative to the bottom plate, and a side wall extending at a third angle relative to the bottom plate. The cooking device also includes at least one first rack removably coupled to the base and extending at a fourth angle relative to the bottom plate. The at least one first rack comprises a main body portion having a rack tab. The cooking device further includes at least one second rack removably coupled to the base and extending at a fifth angle relative to the bottom plate. The at least one second rack comprises a main body portion and an upper plate extending from an upper surface of the second rack main body portion. The second rack main body portion has a rack tab. The base structure is for receiving the rack tabs to secure the respective first and second racks to the base.

DETAILED DESCRIPTION OF THE INVENTION

Figure 1:
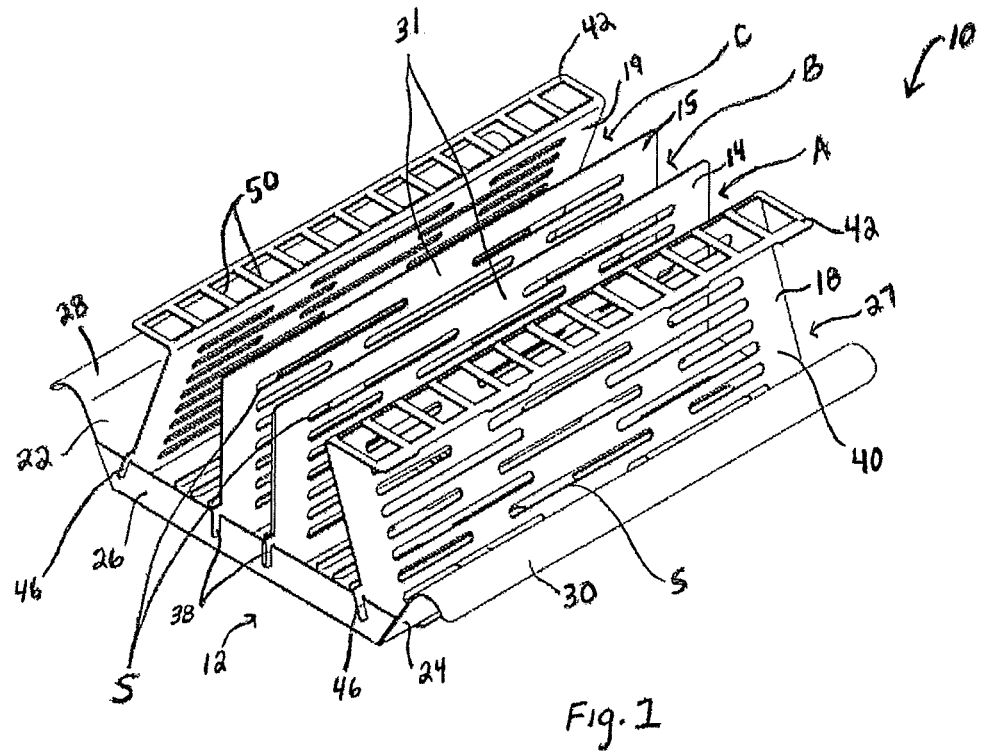
FIG. 1 is a perspective view of a cooking device according to an embodiment of the present invention.

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Referring now to FIG. 1, a cooking device 10 according to an embodiment of the present invention is shown. The cooking device 10 comprises a base 12, at least one first rack (e.g., two first racks (left first 14 and right first 15) are shown in FIG. 1, although any number of first racks could be used), and at least one second rack (e.g., two second racks (left second 18 and right second 19) are shown in FIG. 1, although any number of second racks could be used).

Figure 2:
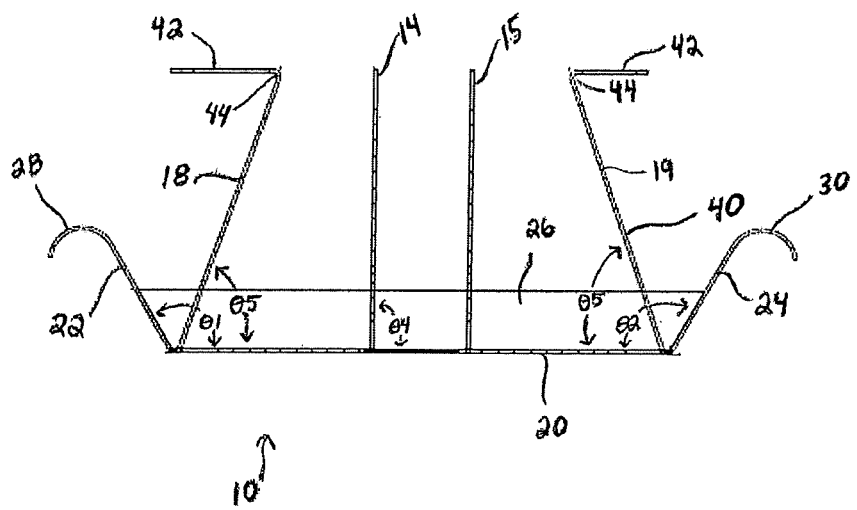
FIG. 2 is an end view of the cooking device of FIG. 1.
Figure 3:
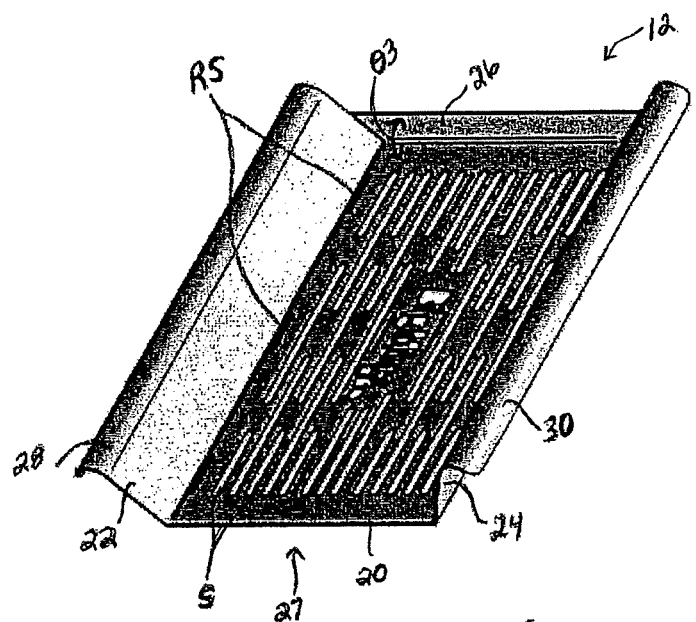
FIG. 3 is a perspective view of a base of the cooking device of FIG. 1.

Referring additionally to FIGS. 2 and 3, the base 12 comprises a bottom plate 20 having a plurality of slots S (FIG. 3) for allowing heat therethrough, a first end wall 22 extending at a first angle θ1 relative to the bottom plate 20 (FIG. 2), a second end wall 24 extending at a second angle θ2 relative to the bottom plate 20 (FIG. 2), a side wall 26 extending at a third angle θ3 relative to the bottom plate 20 (FIG. 3), and an open end 27. In the illustrated embodiment, the first angle θ1 of the first end wall 22 and the second angle θ2 of the second end wall 24 are generally (i.e., for the most part) opposite to one another. The first angle θ1 and the second angle θ2 may be about +/−100 degrees to about +/−150 degrees, and the third angle θ3 may be about 75 degrees to about 100 degrees and preferably may be generally perpendicular to the bottom plate 20, e.g., about 90 degrees relative to the bottom plate 20. In the illustrated embodiment the first end wall 22 includes a first curved handle portion 28 and the second end wall 24 includes a second curved handle portion 30. The first and second curved handle portions 28, 30 can be used, for example, to pick up, hold, move, or reposition the cooking device. It is understood that the first and second end walls 22, 24 could include slots for grasping the cooking device 10, or the handle portions could comprise angled portions in lieu of curved portions.

One use of the cooking device 10 includes using the base 12 alone in either a right-side up position, i.e., with the bottom plate 20 resting on the cooking surface, as shown, for example, in FIG. 3, or in an upside down position, i.e., with the first and second curved handle portions 28, 30 resting on the cooking surface (not shown), for cooking food items, such as vegetables or roasts. The different positions could enable different types of cooking styles, e.g., for cooking different types of foods, such as fish.

The left first rack 14 and the right first rack 15 may be removably coupled to the base 12 and extend at a fourth angle θ4 relative to the bottom plate 20. The fourth angle θ4 may be about (i.e., in the vicinity of, but not necessarily exactly) 90 degrees.

The left first rack 14 will now be described, it being understood that the right first rack 15 may be substantially identical to the left first rack 14. The left first rack 14 includes a main body portion 31 having a plurality of slots S for allowing heat therethrough and a first rack tab 38. The first rack tab 38 may be supported on the top of the sidewall of the base pan 12, or may be received in one of the plurality of notches (not shown) in the sidewall 26 of the base pan 12.

The left second rack 18 and the right second rack 19 may be removably coupled to the base 12 and extend at a fifth angle θ5 relative to the bottom plate 20, see FIG. 2. The fifth angle θ5 of the respective left and right second racks 18, 19 may be about +/−30 degrees to about +/−80 degrees. The left second rack 18 will now be described, it being understood that the right second rack may be substantially identical to the left second rack 18. The left second rack includes a main body portion 40 and an upper plate 42 extending from an upper surface 44 of the rack main body portion 40. The main body portion 40 includes a plurality of slots S for allowing heat therethrough and a second rack tab 46, wherein the second rack tabs 46 may be supported on the top of the sidewall of the base pan 12, or may be received in one of the plurality of notches in the sidewall 26 in the base 12.

The upper plate 42 includes a plurality of cutouts 50, wherein each cutout 50 supports a particular food item, e.g., each cutout 50 may support a food item, such as a chicken wing, in an upright, vertical, or slanted position. The cutouts 50 shown in FIG. 1 are rectangular in shape, however cutouts having other shapes may also be used. Additionally, while 13 cutouts are illustrated in the upper plate 42 shown in FIG. 1, additional or fewer cutouts could be used.

In one embodiment, illustrated in FIG. 1, one possible assembly of the cooking device includes the base 12, the left and right first racks 14, 15 and the left and right second racks 18, 19. The left and right first racks 14, 15 may be positioned on the base 12 such that the first rack tabs 38 of the left and right first racks 14, 15 are received in one of the plurality of notches on the sidewall 26 of the base 12. The left and right first racks 14, 15 may be generally parallel with one another when positioned on the base 12, see FIGS. 1 and 2. The left and right second racks 18, 19 may be respectively positioned between one of the left and right first racks 14, 15 and the adjacent first or second end walls 22, 24 of the base 12, e.g., the left second rack 18 may be positioned between the left first rack 14 and the first end wall 22, and the right second rack 19 may be positioned between the right first rack 15 and the second end wall 24, see FIGS. 1 and 2. The second rack tabs 46 of the left and right second racks 18, 19 may be received in one of the plurality of notches on the sidewall 26 of the base 12. The receiving of the first and second rack tabs 38, 46 into a notch may enable a more secure attachment of the racks 14, 15, 18, 19 to the base 12. In the illustrated embodiment, the left and right second racks 18, 19 are positioned such that the upper surfaces 44 thereof are angled toward one another as the left and right second racks 18, 19 extend away from the bottom plate 20, see FIG. 2. The upper plates 42 may extend from the upper surfaces 44 of the left and right second rack main body portions 40 such that the upper plates 42 are generally parallel to the bottom plate 20 of the base 12.

Positioning the first and second racks 14, 15, 18, and 19 on the base 12, as described above, forms a plurality of elongate channels A, B, and C for inserting particular types of food items to be cooked, see FIG. 1. For example, the channels A, B, and C are suitable for receiving ribs, pork chops, fish, vegetables (e.g., ears of corn), etc. In one exemplary configuration, racks of ribs can be placed into channels A and C, and vegetables can be placed in channel B. Moreover, each of the cutouts 50 in the upper plates 42 can be used to support food items in a hanging or dangling position over the cooking surface of the grill or oven, such as chicken wings, wherein the thinner tip portion of the chicken wing can be inserted into the cutout 50 with the meatier portion supported over the cooking surface to avoid burning/searing of the meatier part. Thus, using the illustrated cooking device 10 with the above noted configuration of food items, it is possible to cook two racks of ribs, 26 chicken wings, and vegetables all at the same time, while conserving other space on the grill or in the oven for further food items.

Figure 4:
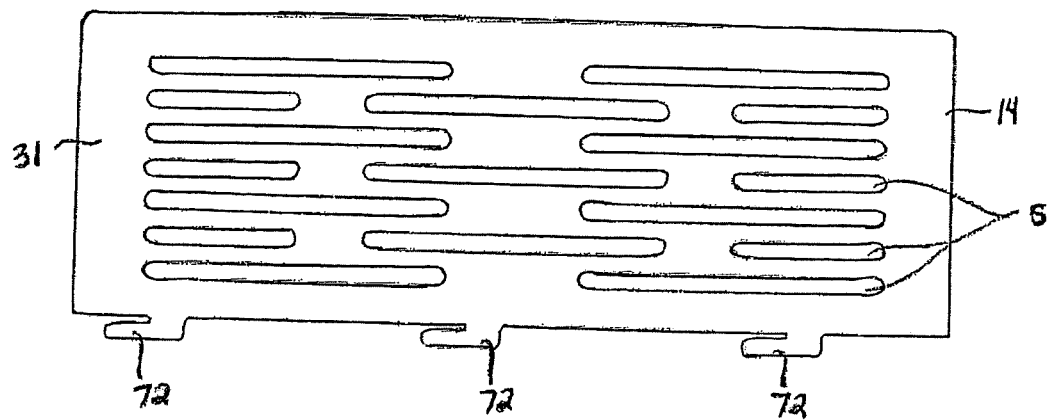
FIG. 4 is a perspective view of a first rack of a cooking device according to another embodiment of the present invention.
Figure 5:
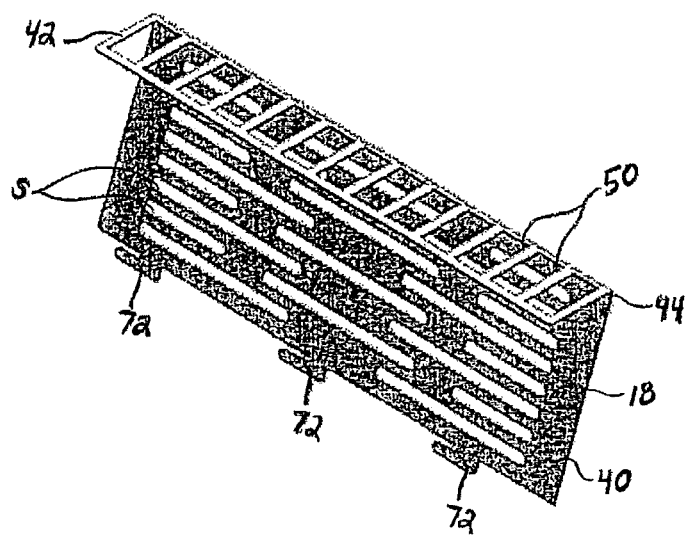
FIG. 5 is a perspective view of a second rack of a cooking device according to another embodiment of the present invention.
Figure 6:
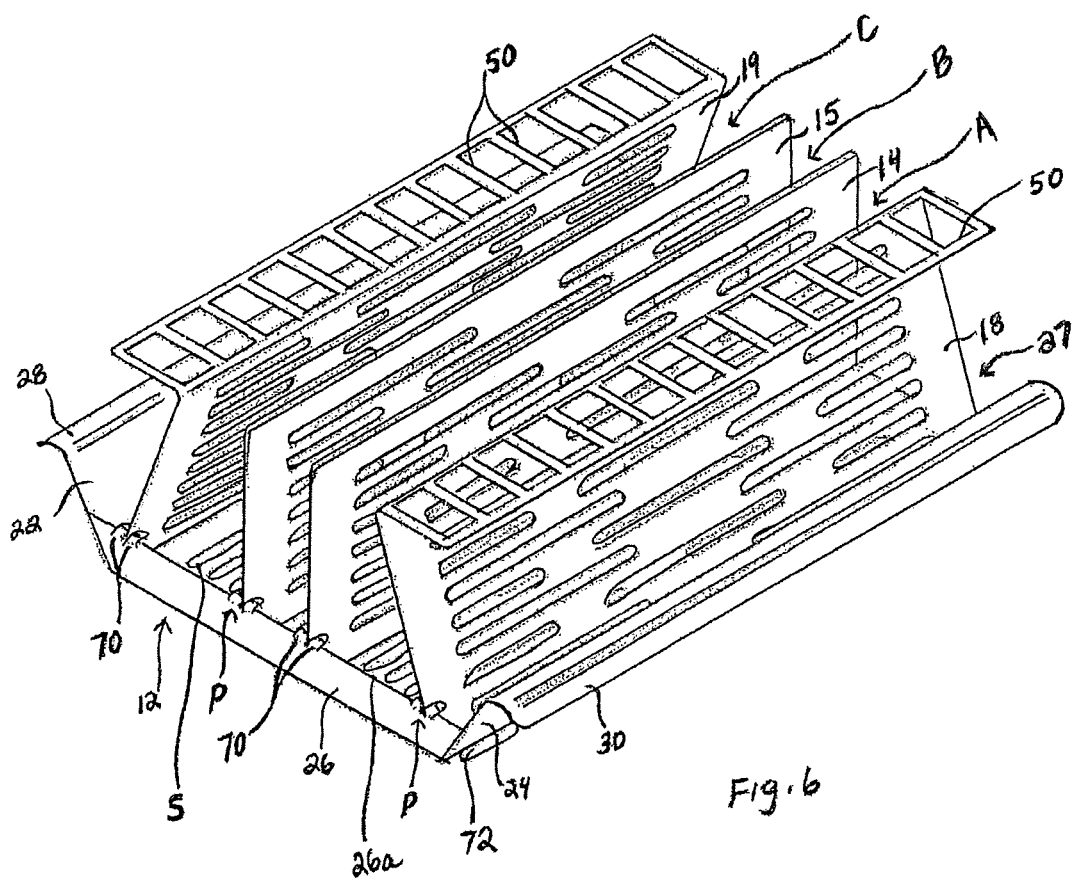
FIG. 6 is a perspective view of a cooking device to be used with the first and second racks of FIGS. 4 and 5.

In a second embodiment, shown in FIGS. 4-6, only structure that differs from the embodiment of FIGS. 1-3 will be described herein. The method of securing of the left and right first racks 14, 15 and the left and right second racks 18, 19 to the base 12 is different in the second embodiment. The sidewall 26 of the base 12 includes a plurality of protrusions 70, which may be grouped into pairs P. The protrusions extend from an upper surface 26a of the sidewall 26 toward the open end 27 of the base 12. Each pair P of protrusions 70 can receive one of the left and right first and second racks 14, 15, 18, 19. Further in this embodiment, the bottom plate 20 of the base 12 includes a plurality of receiving slots RS, see FIG. 3, and the left and right first and second racks 14, 15, 18, 19 each include a plurality of bottom rack tabs 72, see FIGS. 4 and 5. The bottom rack tabs 72 can be received by the receiving slots RS, and in this illustrated embodiment, the combination of the receiving slots RS and the protrusions 70 are used to secure the left and right first and second racks 14, 15, 18, 19 to the base 12.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cooking device comprising:
   a base including a bottom plate having a plurality of slots, a first end wall extending at a first angle relative to the bottom plate, a second end wall extending at a second angle relative to the bottom plate, and a side wall extending at a third angle relative to the bottom plate;
   at least one first rack removably coupled to the base and extending at a fourth angle relative to the bottom plate, the at least one first rack comprising a main body portion having a rack tab; and
   at least one second rack removably coupled to the base and extending at a fifth angle relative to the bottom plate, the at least one second rack comprising a main body portion and an upper plate extending from an upper surface of the second rack main body portion, wherein the upper plate of the at least one second rack includes a plurality of cutouts, each cutout for supporting a particular food item, the second rack main body portion having a rack tab;
   wherein the base includes structure for receiving the rack tabs of the at least one first and at least one second racks to secure the respective first and second racks to the base.

2. The cooking device of claim 1, wherein the first end wall includes a first curved handle portion and the second end wall each includes a second curved handle portion.

3. The cooking device of claim 1, wherein the at least one second rack includes a left second rack and a right second rack.

4. The cooking device of claim 3, wherein the left second rack and right second rack are angled toward one another as they extend away from the base.

5. The cooking device of claim 1, wherein the at least one first rack includes a left first rack and a right first rack.

6. The cooking device of claim 5, wherein the left first rack and the right first rack are generally parallel with one another when secured to the base.

7. The cooking device of claim 1, wherein the at least one first rack includes a left first rack and a right first rack and the at least one second rack includes a left second rack and a right second rack, wherein a plurality of elongate channels are defined between adjacent racks for inserting food items to be cooked on the cooking device.

8. The cooking device of claim 7, wherein the upper plate of the left and right second racks each include a plurality of cutouts, wherein each cutout supports a particular food item.

9. The cooking device of claim 1, wherein the first angle of the first end wall and the second angle of the second end wall are generally opposite to one another.

10. The cooking device of claim 1, wherein the fourth angle is about 90 degrees.

11. The cooking device of claim 1, wherein the first angle and second angle are about +/−100 degrees to about +/−150 degrees.

12. The cooking device of claim 1, wherein the upper plate extends from the upper surface of the second rack main body portion such that the upper plate is generally parallel to the bottom plate of the base.

13. A cooking device comprising:
   a base including a bottom plate having a plurality of slots, a first end wall extending at a first angle relative to the bottom plate, a second end wall extending at a second angle relative to the bottom plate, and a side wall extending at a third angle relative to the bottom plate;
   at least one first rack removably coupled to the base and extending at a fourth angle relative to the bottom plate, the at least one first rack comprising a main body portion having a rack tab; and
   at least one second rack removably coupled to the base and extending at a fifth angle relative to the bottom plate, the at least one second rack comprising a main body portion and an upper plate extending from an upper surface of the second rack main body portion, the second rack main body portion having a rack tab;
   wherein:
      the base includes structure for receiving the rack tabs of the at least one first and at least one second racks to secure the respective first and second racks to the base;
      the at least one first rack includes a left first rack and a right first rack and the at least one second rack includes a left second rack and a right second rack, wherein the upper plate of the left and right second racks each include a plurality of cutouts for supporting a particular food item; and
      a plurality of elongate channels are defined between adjacent racks for inserting food items to be cooked on the cooking device.

14. The cooking device of claim 13, wherein the first end wall includes a first curved handle portion and the second end wall each includes a second curved handle portion.

15. The cooking device of claim 13, wherein the left first rack and the right first rack are generally parallel with one another when secured to the base.

16. The cooking device of claim 13, wherein the first angle of the first end wall and the second angle of the second end wall are generally opposite to one another.

17. The cooking device of claim 13, wherein the fourth angle is about 90 degrees.

18. The cooking device of claim 13, wherein the first angle and second angle are about +/−100 degrees to about +/−150 degrees.

* * * * *